(12) United States Patent
Wang et al.

(10) Patent No.: US 10,575,230 B2
(45) Date of Patent: Feb. 25, 2020

(54) NETWORK SLICING FOR WLAN

(71) Applicant: Google LLC, Mountain View, CA (US)

(72) Inventors: Jibing Wang, Saratoga, CA (US); Erik Richard Stauffer, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/041,119

(22) Filed: Jul. 20, 2018

(65) Prior Publication Data

US 2020/0029264 A1  Jan. 23, 2020

(51) Int. Cl.
*H04W 36/04* (2009.01)
*H04W 36/14* (2009.01)
*H04W 36/00* (2009.01)
*H04W 84/12* (2009.01)

(52) U.S. Cl.
CPC ....... *H04W 36/14* (2013.01); *H04W 36/0058* (2018.08); *H04W 84/12* (2013.01)

(58) Field of Classification Search
None
See application file for complete search history.

(56) References Cited

U.S. PATENT DOCUMENTS

| | | | | |
|---|---|---|---|---|
| 2017/0086118 A1* | 3/2017 | Vrzic | .................... | H04W 36/26 |
| 2017/0295531 A1* | 10/2017 | Singh | .................... | H04W 76/14 |
| 2017/0311304 A1* | 10/2017 | Lu | .................... | H04W 4/70 |
| 2017/0367036 A1* | 12/2017 | Chen | .................... | H04W 76/10 |
| 2018/0054765 A1* | 2/2018 | Kim | .................... | H04W 4/70 |
| 2018/0199160 A1* | 7/2018 | Edge | .................... | H04W 4/02 |
| 2018/0279186 A1* | 9/2018 | Park | .................... | H04W 36/0077 |
| 2018/0288582 A1* | 10/2018 | Buckley | .................... | H04W 4/90 |
| 2018/0324645 A1* | 11/2018 | Park | .................... | H04W 36/0016 |
| 2018/0324663 A1* | 11/2018 | Park | .................... | H04W 36/08 |
| 2018/0324740 A1* | 11/2018 | Edge | .................... | G01S 5/0236 |
| 2018/0343635 A1* | 11/2018 | Edge | .................... | G01S 5/00 |
| 2018/0352491 A1* | 12/2018 | Shih | .................... | H04W 36/14 |

(Continued)

FOREIGN PATENT DOCUMENTS

| | | |
|---|---|---|
| WO | 2016011011 | 1/2016 |
| WO | 2017135858 | 8/2017 |

(Continued)

OTHER PUBLICATIONS

Alfoudi, et al., "Traffic Management in LTE-WiFi Slicing Networks", Department of Computer Science, Liverpool John Moores University, L3 3AF, UK, Apr. 2017, 6 pages.*

(Continued)

*Primary Examiner* — Kevin D Mew
(74) *Attorney, Agent, or Firm* — Colby Nipper PLLC (57) ABSTRACT

This document describes network slicing for WLAN in cellular networks. The techniques described enable the use of WLAN network slices (216c) with cellular networks (202) and mobility management of user equipment (102) between cellular networks (202) and WLAN networks (206). An Access and Mobility Function-Aggregation Proxy (AMF-AP) (218) connects one or more WLAN networks (206) to the cellular core network (110) of a network operator via the Access and Mobility Function (AMF) (212) in the core network (110). The AMF-AP (218) acts as a proxy and a firewall to protect the AMF (212) and other entities in the cellular core network (110) from malicious actors.

20 Claims, 6 Drawing Sheets

(56) References Cited

U.S. PATENT DOCUMENTS

| | | | | |
|---|---|---|---|---|
| 2018/0376446 A1* | 12/2018 | Youn | ........................ | H04W 8/20 |
| 2019/0037338 A1* | 1/2019 | Edge | ........................ | H04W 4/20 |
| 2019/0045477 A1* | 2/2019 | Edge | ........................ | H04W 24/08 |
| 2019/0166523 A1* | 5/2019 | Shaw | ................ | H04W 36/0022 |
| 2019/0208438 A1* | 7/2019 | Yang | ........................ | H04L 43/08 |
| 2019/0253944 A1* | 8/2019 | Kim | .................. | H04W 36/0085 |
| 2019/0253949 A1* | 8/2019 | Park | ........................ | H04W 24/10 |
| 2019/0261233 A1* | 8/2019 | Duan | ................ | H04W 36/0066 |

FOREIGN PATENT DOCUMENTS

| | | |
|---|---|---|
| WO | 2017171598 | 10/2017 |
| WO | 2018029931 | 2/2018 |
| WO | 2018034924 | 2/2018 |
| WO | 2018128076 | 7/2018 |

OTHER PUBLICATIONS

"International Search Report and Written Opinion", PCT Application No. PCT/US2019/041847, dated Dec. 16, 2019, 17 pages.
"Invitation to Pay Additional Fees", PCT Application No. PCT/US2019/041847, dated Oct. 22, 2019, 13 pages.
Tomici, et al., "Integrated Small Cell and Wi-Fi Networks—Need NPL", 2015 IEEE Wireless Communications and Networking Conference (WCNC), IEEE, Mar. 9, 2015, Mar. 9, 2015, 6 pages.

\* cited by examiner

NETWORK SLICING FOR WLAN

BACKGROUND

The evolution of wireless communication to fifth generation (5G) standards and technologies provides higher data rates and greater capacity, with improved reliability and lower latency, which enhances mobile broadband services. 5G technologies also provide new classes of service for vehicular networking, fixed wireless broadband, and the Internet of Things (IoT).

Each of these classes of service in 5G is described as a network slice that can be viewed as an end-to-end logical network that spans multiple portions of a 5G network. Each network slice can have dedicated resources in the network of a single network operator or across the network of multiple network operators. Each network slice provides service qualities tailored to the use case associated with the network slice, such as low latency, guaranteed bandwidth, support for long-battery-life IoT devices, and so forth.

Offloading data traffic from a cellular network to a wireless local area network (WLAN) and handing over network connections from cellular to WLAN reduces the cost of data transmission for end users and network operators. However, conventional techniques for interoperability between cellular and WLAN have challenges with handover timing, dropped data traffic and context, unreliable WLAN access points, varying levels of service quality, or the like.

SUMMARY

This summary is provided to introduce simplified concepts of network slicing for WLAN. The simplified concepts are further described below in the Detailed Description. This summary is not intended to identify essential features of the claimed subject matter nor is it intended for use in determining the scope of the claimed subject matter.

In some aspects, a method of managing mobility of a user equipment between a WLAN network and a cellular network is described, in which an Access and Mobility Function (AMF) server sends a measurement report request to the user equipment and receives one or more measurement reports from the user equipment. The AMF server determines to initiate a handoff of the user equipment from a first network slice in the cellular network to a second network slice in the WLAN network and sends a handoff message to the user equipment and a base station in the cellular network that is effective to cause the handoff of the user equipment from the first network slice to the second network slice.

In other aspects, a system comprises a WLAN network and a cellular network including an Access and Mobility Function (AMF) server, in which the AMF server is configured to send a measurement report request to a user equipment and receive one or more measurement reports from the user equipment. The AMF server determines to initiate a handoff of the user equipment from a first network slice in the cellular network to a second network slice in the WLAN network and sends a handoff message to the user equipment and a base station in the cellular network, which is effective to cause the handoff of the user equipment from the first network slice to the second network slice.

In further aspects, an Access and Mobility Function-Aggregation Proxy (AMF-AP) server device includes one or more processors and a memory comprising instructions for an Access and Mobility Function-Aggregation Proxy application. The AMF-AP application is executable to configure the one or more processors to relay control-plane data for a user equipment from a network slice in a WLAN network to an Access and Mobility Function (AMF) in a cellular network and relays user-plane data for the user equipment in the network slice to the Internet via the core network of the cellular network.

BRIEF DESCRIPTION OF THE DRAWINGS

Aspects of network slicing for WLAN are described with reference to the following drawings. The same numbers are used throughout the drawings to reference like features and components.

DETAILED DESCRIPTION

Overview

This document describes network slicing for WLAN in cellular networks, such as a Fifth Generation New Radio (5G NR) wireless network. The techniques described enable the use of WLAN network slices with cellular networks and mobility management of user equipment between cellular and WLAN (e.g., Wi-Fi or WiFi) networks. An Access and Mobility Function-Aggregation Proxy (AMF-AP) connects one or more WLAN networks to the cellular core network of a network operator via the Access and Mobility Function (AMF) in the core network. The AMF-AP acts as a proxy and a firewall to protect the AMF and other entities in the cellular core network from malicious actors.

In aspects, a network slice for WLAN is created in a cellular network to improve interoperability of cellular and WLAN networks. A WLAN network slice is created for each external WLAN network that connects to the core network of a network operator. The external WLAN network slice connects to the Access and Mobility Function (AMF) of the core network of the network operator by either connecting directly to the AMF or via an Access and Mobility Function-Aggregation Proxy (AMF-AP).

With a WLAN connection being managed as a network slice, an external WLAN network can exchange packet data context information for a user equipment with the cellular network and the AMF can assist the user equipment to determine handover timing. Data traffic for a user equipment over a WLAN network slice can be routed to the Internet through the cellular core network of the network operator or routed through an Internet connection of the WLAN network operator.

In aspects, network slicing for WLAN provides new interfaces, messages, and management functions to support coordination of communications between cellular and WLAN networks and to manage mobility of user equipment and data traffic of the user equipment between cellular and WLAN networks.

While features and concepts of the described systems and methods for network slicing for WLAN can be implemented in any number of different environments, systems, devices, and/or various configurations, aspects of network slicing for WLAN are described in the context of the following example devices, systems, and configurations.

Example Environment

Figure 1:
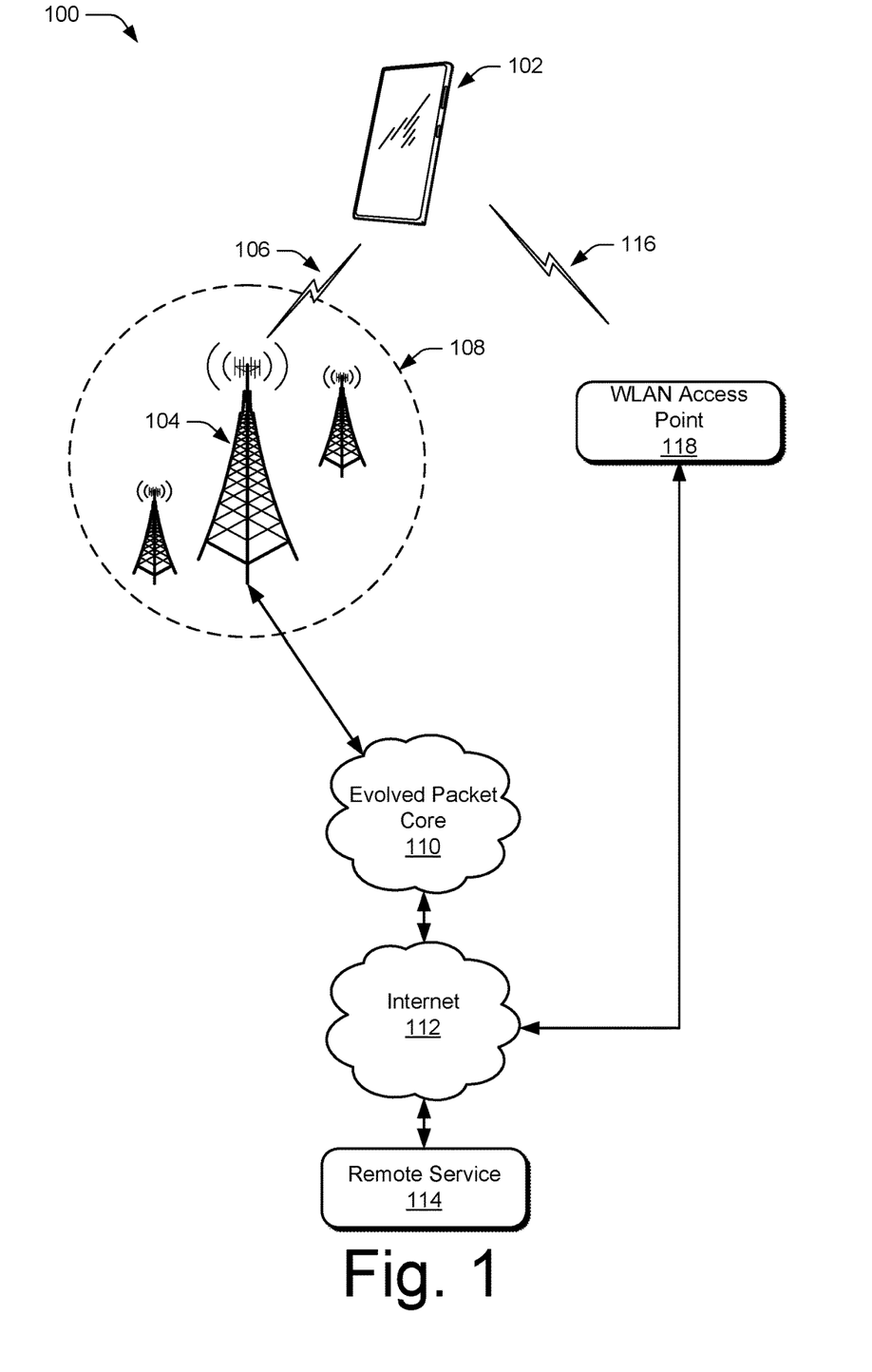
FIG. 1 illustrates an example wireless network environment in which various aspects of network slicing for WLAN can be implemented.

FIG. 1 illustrates an example environment 100, which includes a user equipment 102 (UE 102) that communicates with a base station 104 through a wireless communication link 106 (wireless link 106). In this example, the user equipment 102 is implemented as a smartphone. Although illustrated as a smartphone, the user equipment 102 may be implemented as any suitable computing or electronic device, such as a mobile communication device, a modem, cellular phone, gaming device, navigation device, media device, laptop computer, desktop computer, tablet computer, smart appliance, vehicle-based communication system, and the like. The base station 104 (e.g., an Evolved Universal Terrestrial Radio Access Network Node B, E-UTRAN Node B, evolved Node B, eNodeB, eNB, Next Generation Node B, gNode B, gNB, and the like) may be implemented in a macrocell, microcell, small cell, picocell, and the like, or any combination thereof.

The base station 104 communicates with the user equipment 102 via the wireless link 106, which may be implemented as any suitable type of wireless link. The wireless link 106 can include a downlink of data and control information communicated from the base station 104 to the user equipment 102, an uplink of other data and control information communicated from the user equipment 102 to the base station 104, or both. The wireless link 106 may include one or more wireless links or bearers implemented using any suitable communication protocol or standard, or combination of communication protocols or standards such as 3rd Generation Partnership Project Long-Term Evolution (3GPP LTE), 5G NR, and so forth. The base station 104 and any additional base stations are collectively a Radio Access Network 108 (RAN 108, Evolved Universal Terrestrial Radio Access Network 108, E-UTRAN 108), which are connected via an Evolved Packet Core 110 (EPC 110) network to form a wireless operator network. The user equipment 102 may connect, via the EPC 110, to public networks, such as the Internet 112 to interact with a remote service 114.

The user equipment 102 also can connect to the Internet 112 using a WLAN connection 116 to a WLAN access point 118 that is connected to the Internet 112. The WLAN access point 118 may be located in a user's home, an office, airport, coffee shop, and so forth. Each WLAN access point 118 may be independently operated, such as in a user's home, may be part of an enterprise network, or may be operated as part of a public network of WLAN access points operated by a wireless network operator. The WLAN wireless network operator may be the same as the operator of the RAN 108 or different than the operator of the RAN 108.

Figure 2:
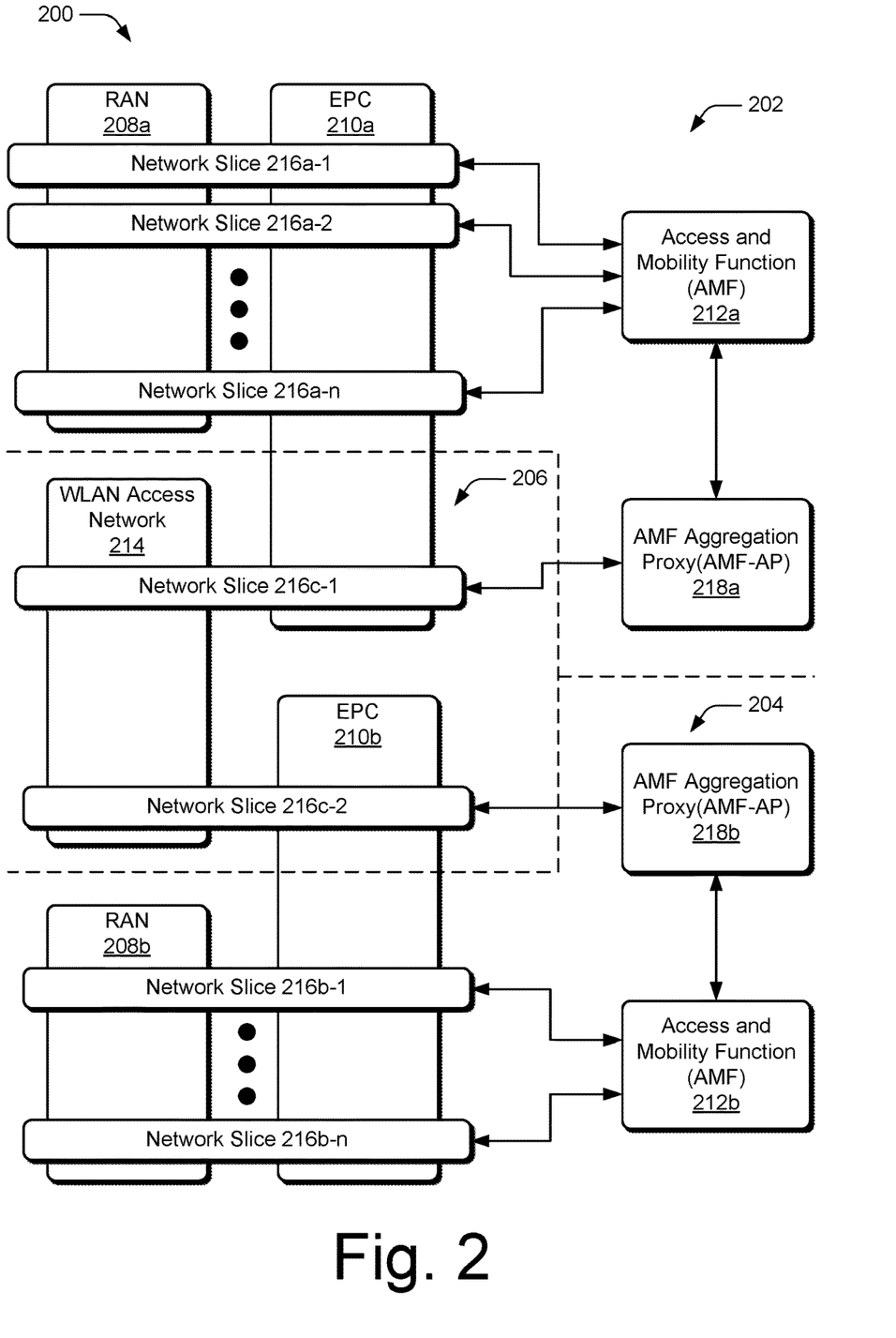
FIG. 2 illustrates an example environment as generally relating to network slices in cellular and WLAN networks that can implement various aspects of network slicing for WLAN can be implemented.

FIG. 2 illustrates an example environment 200 in which various aspects of network slicing for WLAN can be implemented. A first cellular network of a first wireless network operator is shown at 202, a second cellular network of a second wireless network operator is shown at 204, and a WLAN network is shown at 206.

Each cellular network includes a RAN 108 illustrated as RAN 208a and RAN 208b, as well as an EPC 110 illustrated as EPC 210a and EPC 210b. Each cellular network includes an Access and Mobility Function 212 (AMF 212) illustrated as AMF 212a and AMF 212b. Each AMF 212 provides control-plane functions such as registration and authentication of multiple user equipment 102, authorization, mobility management, or the like. The AMF 212 communicates with the base stations 104 in a respective RAN 208 and also communicates with multiple user equipment 102, via the base stations 104.

The WLAN network 206 includes a WLAN Access Network 214 that includes one or more WLAN access points and associated network infrastructure, such as routers, switches, firewalls, authentication servers, an Internet connection, or the like. The scope of the WLAN network 206 can range from a single WLAN router with its associated Internet connection to a network including multiple WLAN access points operated by an enterprise, an Internet Service Provider (ISP), a municipality, a university, or the like, and distributed about a building, a campus, a city, or a geographic region.

A network slice 216 defines a class of service in a cellular network and can be viewed as an end-to-end logical network that spans multiple portions of the cellular network. For example, in the first cellular network 202, a network slice 216a-1 may provide a class of service for 5G enhanced Mobile Broadband (eMBB), a network slice 216a-2 may provide a class of service for 5G Ultra Reliable Low Latency Communications (URLLC), and a network slice 216a-n may provide a class of service for 5G massive Machine Type Communications (mMTC). Similarly in the second cellular network 204, a network slice 216b-1 may provide the class of service for 5G enhanced Mobile Broadband (eMBB) and a network slice 216b-n may provide the class of service for 5G massive Machine Type Communications (mMTC). The first cellular network 202 and the second cellular network 204 may include any number network slices 216 including network slices 216 not illustrated in FIG. 2.

For some classes of service, such as those providing mobile broadband, it is desirable to offload broadband data traffic from a cellular network to a WLAN network. Such offloading may be done to increase cellular network capacity, reduce end user cost for data, provide higher data rates for user-plane data, or the like. To improve the integration of WLAN and cellular networks, a network slice 216 can be defined in the WLAN network 206. For example, a network slice 216c-1 is defined for a class of service, such as eMBB, in the WLAN network 216 for a WLAN connection with a user equipment 102 that is connected to the cellular network 202. Similarly, a network slice 216c-1 is defined for eMBB for another user equipment 102 that is connected to the second cellular network 204.

Although illustrated as providing WLAN connectivity for the first wireless network and the second wireless network, the WLAN network 206 may provide WLAN connectivity to any number of wireless networks. Likewise, although the first cellular network 202 and the second cellular network 204 are illustrated as being connected to a single WLAN network 206, the first cellular network 202 and the second cellular network 204 may each be connected to any number of common or different WLAN networks. A network slice 216c in the WLAN network 206 can be created for each cellular network or for each user equipment 102 that is connected over the WLAN network 206.

Each network slice 216c in the WLAN network 206 is connected to a cellular network via an Access and Mobility Function-Aggregation Proxy 218 (AMF-AP 218) in the cellular network, illustrated as AMF-AP 218a and AMF-AP 218b. The AMF-AP 218 is connected in turn to the AMF 212 in the cellular network. The AMF-AP 218 acts as a proxy for the AMF 212 for network slices 216c in the WLAN network 206 and can provide a firewall for the AMF 212 to protect from malicious traffic. Alternatively, a network slice 216c may connect to the AMF 212 in the cellular network without the use of an AMF-AP 218.

When a user equipment 102 is connected via a network slice 216c in the WLAN network 206, user-plane data traffic for the user equipment 102 is routed through a serving gateway in the EPC 110 of the cellular network. Alternatively or optionally, the user-plane data traffic of the user equipment 102 in the network slice 216c may be routed through an Internet connection of the WLAN network 206.

Figure 3:
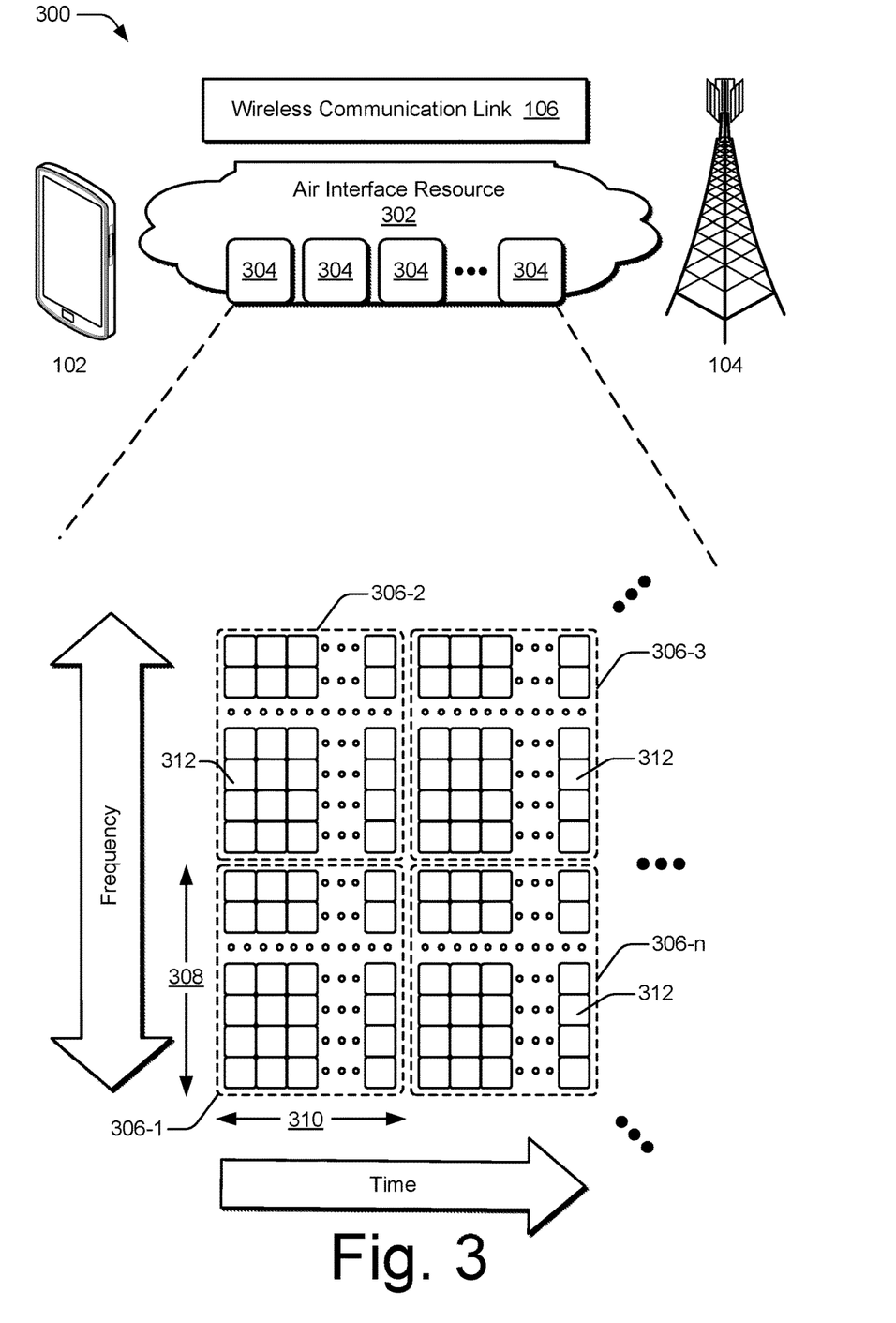
FIG. 3 illustrates an air interface resource that extends between a user equipment and a base station and with which various aspects of network slicing for WLAN can be implemented.

FIG. 3 illustrates an air interface resource that extends between a user equipment and a base station and with which various aspects of network slicing for WLAN techniques can be implemented. The air interface resource 302 can be divided into resource units 304, each of which occupies some intersection of frequency spectrum and elapsed time. A portion of the air interface resource 302 is illustrated graphically in a grid or matrix having multiple resource blocks 306, including resource blocks 306-1, 306-2, 306-3 . . . 306-n, with "n" representing some positive integer. An example of a resource unit 304 therefore includes at least one resource block 306. As shown, time is depicted along the horizontal dimension as the abscissa axis, and frequency is depicted along the vertical dimension as the ordinate axis. The air interface resource 302, as defined by a given communication protocol or standard, may span any suitable specified frequency range and/or may be divided into intervals of any specified duration. Increments of time can correspond to, for example, milliseconds (mSec). Increments of frequency can correspond to, for example, megahertz (MHz).

In example operations generally, the base station 104 allocates portions (e.g., resource units 304) of the air interface resource 302 for uplink and downlink communications. Each resource block 306 of network access resources may be allocated to support respective wireless communication link 106 of multiple user equipment 102. In the lower left corner of the grid, the resource block 306-1 may span, as defined by a given communication protocol, a specified frequency range 308 and comprise multiple subcarriers or frequency sub-bands. The resource block 306-1 may include any suitable number of subcarriers (e.g., 12) that each correspond to a respective portion (e.g., 15 kHz) of the specified frequency range 308 (e.g., 180 kHz). The resource block 306-1 may also span, as defined by the given communication protocol, a specified time interval 310 or time slot (e.g., lasting approximately one-half millisecond or 7 orthogonal frequency-division multiplexing (OFDM) symbols). The time interval 310 includes subintervals that may each correspond to a symbol, such as an OFDM symbol. As shown in FIG. 3, each resource block 306 may include multiple resource elements 312 (REs) that correspond to, or are defined by, a subcarrier of the frequency range 308 and a subinterval (or symbol) of the time interval 310. Alternatively, a given resource element 312 may span more than one frequency subcarrier or symbol. Thus, a resource unit 304 may include at least one resource block 306, at least one resource element 312, and so forth.

In example implementations, multiple user equipment 102 (one of which is shown) are communicating with the base station 104 through access provided by portions of the air interface resource 302. A resource manager in the base station 104 or the EPC 110 may determine a respective type or amount of information (e.g., data or control information) to be communicated (e.g., transmitted) by the user equipment 102. For example, the resource manager can determine that each user equipment 102 is to transmit a different respective amount of information. The resource manager then allocates one or more resource blocks 306 to each user equipment 102 based on the determined amount of information.

Additionally or in the alternative to block-level resource grants, the resource manager may allocate resource units at an element-level. Thus, the resource manager may allocate one or more resource elements 312 or individual subcarriers to different user equipment 102. By so doing, one resource block 306 can be allocated to facilitate network access for multiple user equipment 102. Accordingly, the resource manager may allocate, at various granularities, one or up to all subcarriers or resource elements 312 of a resource block 306 to one user equipment 102 or divided across multiple user equipment 102, thereby enabling higher network utilization or increased spectrum efficiency.

The resource manager can therefore allocate air interface resource 302 by resource unit 304, resource block 306, frequency carrier, time interval, resource element 312, frequency subcarrier, time subinterval, symbol, spreading code, some combination thereof, and so forth. Based on respective allocations of resource units 304, the resource manager can transmit respective messages to the multiple user equipment 102 indicating the respective allocation of resource units 304 to each user equipment 102. Each message may enable a respective user equipment 102 to queue the information or configure an LTE transceiver, an 5G NR transceiver, or both to communicate via the allocated resource units 304 of the air interface resource 302. The resource manager can allocate dedicated resources to a network slice 216 based on the requirements of the network slice 216. The resource manager allocates the dedicated resources based on the service qualities of the network slice 216, such as latency, guaranteed bandwidth, support for long-battery-life IoT devices, or the like.

WLAN Network Slice Operations

In aspects, by integrating WLAN communication with the user equipment 102 into the EPC 110 as a network slice 216, control-plane and user-plane data can be communicated to the user equipment 102 via a WLAN network as well as a cellular network. For example, context information for user equipment 102 data communications using Transmission Control Protocol (TCP), User Datagram Protocol (UDP) and/or Internet Protocol (IP) can be communicated between the cellular network and the user equipment 102 via the WLAN network slice 216c using a WLAN Slice UE Context message.

Figure 4:
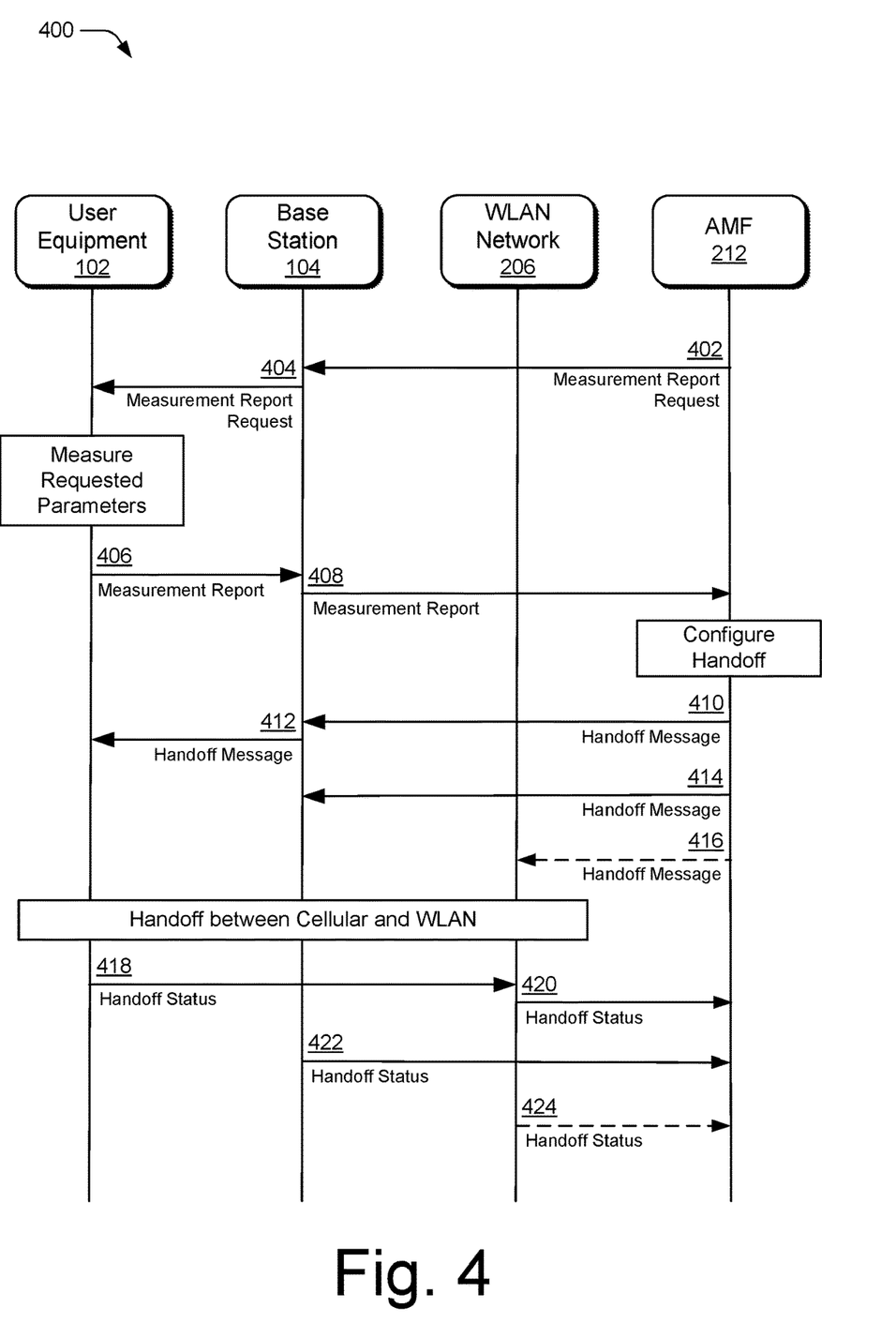
FIG. 4 illustrates example details of data and control transactions between devices in accordance with aspects of handover of network slicing for WLAN.

FIG. 4 illustrates details of example data and control transactions between devices engaged in a handover in accordance with various aspects of network slicing for WLAN. In aspects, the AMF 212 can assist in the handoff of the user equipment 102 between a cellular network and a WLAN network. The AMF 212 can determine and communicate the timing of a handoff to the user equipment 102 and the base station 104. The AMF 212 can configure a measurement report for the user equipment 102 to determine metrics for the cellular network and the WLAN network. Based on the metrics, the AMF 212 can determine when to initiate the handoff.

In an example, the AMF 212 sends a measurement report request for the user equipment 102 to the base station 104, at 402, and the base station 104 forwards the measurement report request to the user equipment, at 404. The measurement report request includes parameters for measurement of the cellular and/or WLAN networks by the user equipment 102, such as link quality measurements, upper-layer metrics, a period of time over which to perform the measurements, a time interval between measurements, a number of measurement reports to provide, or the like. The user equipment 102 measures the requested parameters and sends one or more measurement reports for the AMF 212 to the base station 104, at 406, and the base station 104 forwards the one or more measurement reports to the AMF 212, at 408.

Based on the received measurement reports, the AMF 212 determines whether or not to handoff one or more bearers of the user equipment 102 to the WLAN network 206. If the AMF 212 determines the WLAN network 206 will provide the required services for a network slice 216c for the user equipment 102, the AMF 212 sends a handoff message for the user equipment 102 to the base station 104, at 410, and the base station 104 forwards the handoff message to the user equipment, at 412. The AMF 212 sends another handoff message to the base station 104, at 414. Alternatively, the handoff message for the user equipment 102 may be sent to the user equipment 102 may be sent via the WLAN network 206. The handoff messages include parameters for the handoff, such as a timing of when to perform the handoff. Optionally or additionally, the AMF 212 sends a handoff message to the WLAN network 206, at 416. Although this example describes a handoff from cellular to WLAN, the described techniques apply equally to handoffs of the user equipment 102 from a WLAN network to a cellular network.

At the time indicated for the handoff, the user equipment 102 is handed off from the base station 104 of the cellular network to the WLAN network 206. At 418, the user equipment 102 sends handoff status for the AMF 212 to the WLAN network 206, which forwards the handoff status to the AMF 212 at 420. The base station 104 sends handoff status to the AMF 212, at 422. Optionally at 424, the WLAN network 206 sends handoff status to the AMF 212. Alternatively, if the WLAN network 206 lacks the capability to send handoff status, the AMF 212, the AMF-AP 218, and/or other services in the EPC 110 can monitor user-plane and/or control plane data traffic from the user equipment 102 to infer the status of the handoff.

Example Devices

Figure 5:
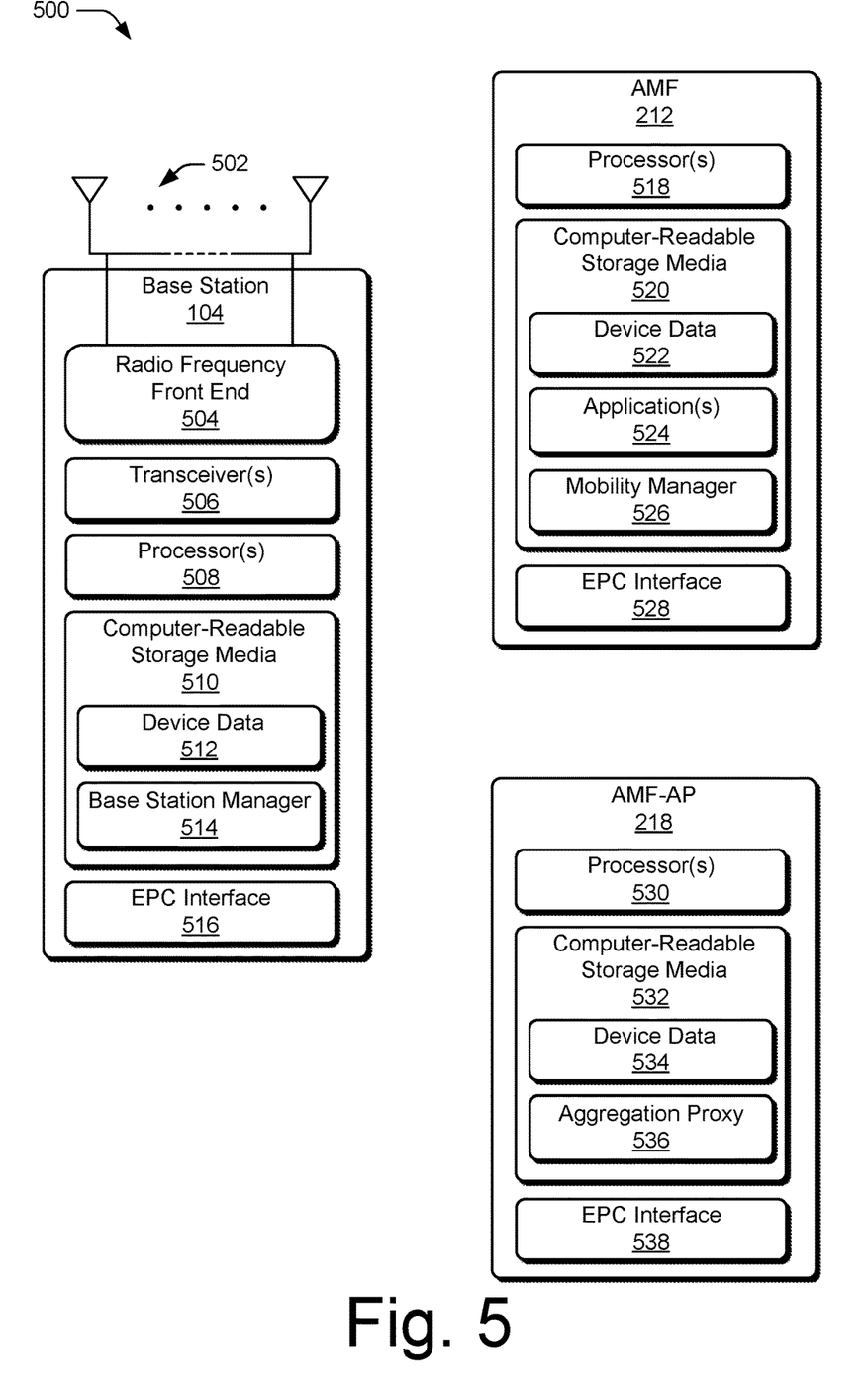
FIG. 5 illustrates an example device diagram for devices that can implement various aspects of network slicing for WLAN.

FIG. 5 illustrates an example device diagram 500 of the base station 104, the AMF 212, and the AMF-AP 218. It should be noted that only the features of the base station 104, the AMF 212, and the AMF-AP 218 related to the techniques described herein are illustrated here. The base station 104, the AMF 212, and the AMF-AP 218 may include additional features that are omitted from FIG. 5 for the sake of clarity.

The device diagram for the base station 104 shown in FIG. 5 includes a single network node (e.g., an E-UTRAN Node B or gNode B). The functionality of the base station 104 may be distributed across multiple network nodes and/or devices and may be distributed in any fashion suitable to perform the functions described herein. The base station 104 includes antennas 502, a radio frequency front end 504 (RF front end 504), one or more transceivers 506 that include LTE transceivers, and/or 5G NR transceivers for communicating with the user equipment 102. The RF front end 504 of the base station 104 can couple or connect the transceivers 506 to the antennas 502 to facilitate various types of wireless communication. The antennas 502 of the base station 104 may include an array of multiple antennas that are configured similarly to or differently from each other. The antennas 502 and the RF front end 504 can be tuned to, and/or be tunable to, one or more frequency bands defined by the 3GPP LTE and 5G NR communication standards and implemented by the transceivers 506. Additionally, the antennas 502, the RF front end 504, and/or the transceivers 506 may be configured to support beamforming, such as Massive-MIMO, for the transmission and reception of communications with the user equipment 102.

The base station 104 also includes processor(s) 508 and computer-readable storage media 510 (CRM 510). The processor 508 may be a single core processor or a multiple core processor composed of a variety of materials, such as silicon, polysilicon, high-K dielectric, copper, and so on. CRM 510 may include any suitable memory or storage device such as random-access memory (RAM), static RAM (SRAM), dynamic RAM (DRAM), non-volatile RAM (NVRAM), read-only memory (ROM), or Flash memory useful to store device data 512 of the base station 104. The device data 512 includes network scheduling data, radio resource management data, applications, and/or an operating system of the base station 104, which are executable by processor(s) 508 to enable communication with the user equipment 102.

CRM 510 also includes a base station manager 514. Alternately or additionally, the base station manager 514 may be implemented in whole or part as hardware logic or circuitry integrated with or separate from other components of the base station 104. In at least some aspects, the base station manager 514 configures the transceivers 506 for communication with the user equipment 102, as well as communication with the EPC 110 via an EPC interface 516.

The device diagram for the AMF 212 shown in FIG. 5 includes a single network node (e.g., a server). The functionality of the AMF 212 may be distributed across multiple network nodes and/or devices and may be distributed in any fashion suitable to perform the functions described herein. The AMF 212 includes processor(s) 518 and computer-readable storage media 520 (CRM 520). The processor 518 may be a single core processor or a multiple core processor composed of a variety of materials, such as silicon, polysilicon, high-K dielectric, copper, and so on. CRM 520 may include any suitable memory or storage device such as random-access memory (RAM), static RAM (SRAM), dynamic RAM (DRAM), non-volatile RAM (NVRAM), read-only memory (ROM), hard disk drives, or Flash memory useful to store device data 522 of the AMF 212. The CRM 520 includes applications 524, such a mobility manager 526 to manage and control mobility of multiple user equipment 102 within a cellular network and/or between a cellular network and the WLAN network 206, and/or an operating system of the AMF 212, which are executable by processor(s) 518 to enable communication with the user equipment 102, the base station 104, and the AMF-AP 218. The AMF 212 includes an EPC interface 528 for communication with the AMF-AP 218, other devices in the EPC 110, the WLAN network 206, the user equipment 102, and/or devices in the RAN 108.

The device diagram for the AMF-AP 218 shown in FIG. 5 includes a single network node (e.g., a server). The functionality of the AMF-AP 218 may be distributed across multiple network nodes and/or devices and may be distributed in any fashion suitable to perform the functions described herein or implemented with other suitable techniques, such as Software-Defined Networking (SDN) or the like. The AMF-AP 218 includes processor(s) 530 and computer-readable storage media 532 (CRM 532). The processor 530 may be a single core processor or a multiple core processor composed of a variety of materials, such as silicon, polysilicon, high-K dielectric, copper, and so on. CRM 532 may include any suitable memory or storage device such as random-access memory (RAM), static RAM (SRAM), dynamic RAM (DRAM), non-volatile RAM (NVRAM), read-only memory (ROM), hard disk drives, or Flash memory useful to store device data 534 of the AMF-AP 218. The CRM 532 includes applications such as an aggregation proxy 536 and/or an operating system of the AMF-AP 218, which are executable by processor(s) 530 to enable communication with the user equipment 102, the base station 104, and the AMF 212. The AMF-AP 218 includes an EPC interface 538 for communication with the AMF 212, other devices in the EPC 110, the WLAN network 206, the user equipment 102, and/or devices in the RAN 108.

Example Methods

Example method 600 is described with reference to FIG. 6 in accordance with one or more aspects of network slicing for WLAN. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 6:
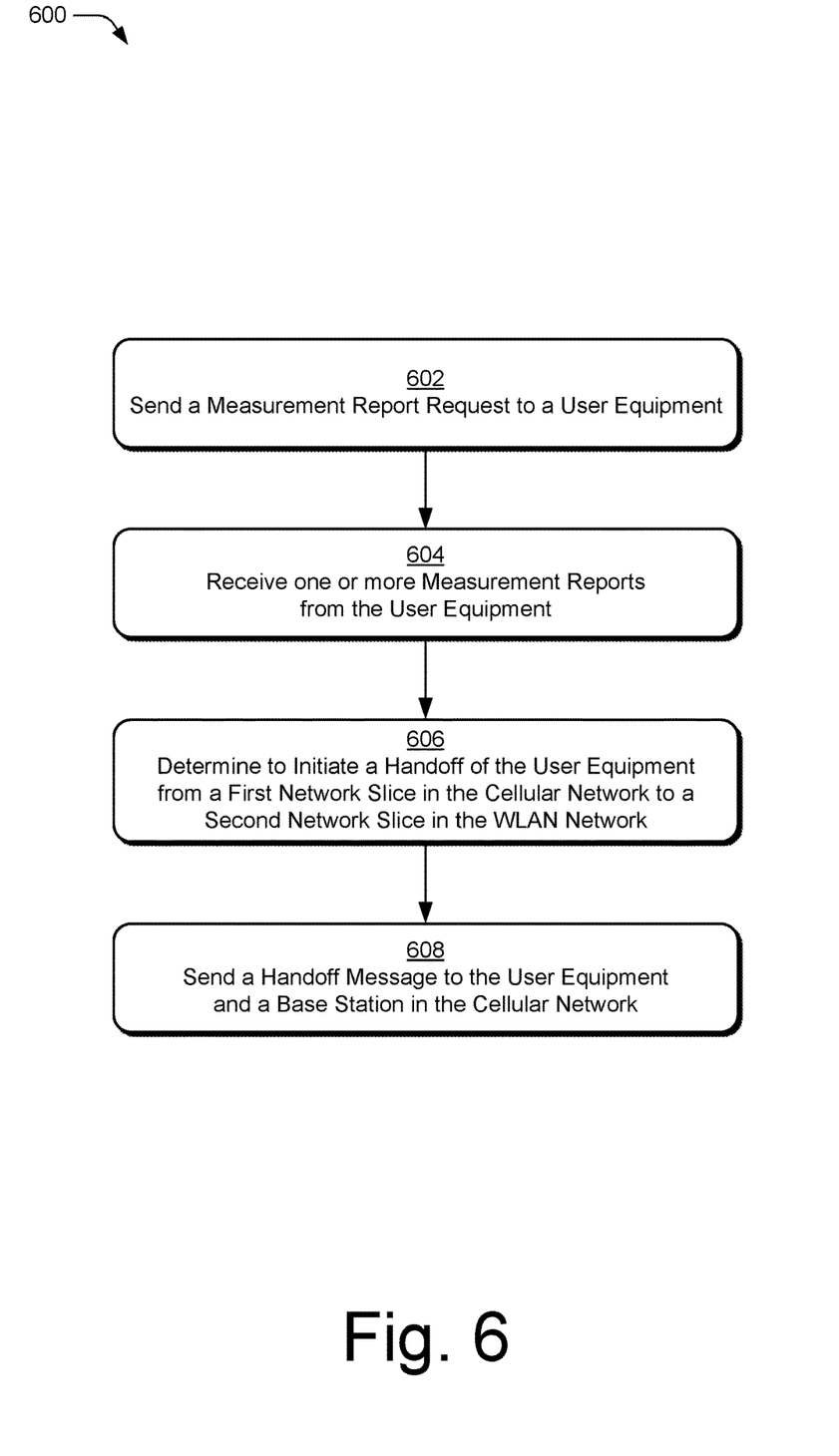
FIG. 6 illustrates an example method of network slicing for WLAN as generally related to a handoff of a user equipment between network slices in accordance with aspects of the techniques described herein.

FIG. 6 illustrates example method(s) 600 of network slicing for WLAN as generally related to a handoff of the user equipment 102 between network slices. The order in which the method blocks are described are not intended to be construed as a limitation, and any number of the described method blocks can be combined in any order to implement a method or an alternate method.

At block 602, an Access and Mobility Function server sends a measurement report request to a user equipment. For example, the AMF 212a sends a measurement report request to the user equipment 102.

At block 604, the Access and Mobility Function server receives one or more measurement reports from the user equipment. For example, the AMF 212a receives one or more measurements reports regarding the RAN 208a and the WLAN network 206 from the user equipment 102.

At block 606, the Access and Mobility Function server determines to initiate a handoff of the user equipment from a first network slice in the cellular network to a second network slice in the WLAN network. For example, based on the one or more measurement reports, the AMF 212a determines to initiate a handoff of the user equipment 102 from the network slice 216a-1 in the cellular network 202 to the network slice 216c-1 in the WLAN network 206.

At block 608, the Access and Mobility Function server sends a handoff message to the user equipment and a base station in the cellular network that is effective to cause the handoff of the user equipment from the first network slice to the second network slice. For example, the AMF 212a sends a handoff message to the user equipment 102 and a base station 104 in the cellular network 202 that is effective to cause the handoff of the user equipment 102 from the network slice 216a-1 in the cellular network 202 to the network slice 216c-1 in the WLAN network 206.

Although aspects of network slicing for WLAN have been described in language specific to features and/or methods, the subject of the appended claims is not necessarily limited to the specific features or methods described. Rather, the specific features and methods are disclosed as example implementations of network slicing for WLAN, and other equivalent features and methods are intended to be within the scope of the appended claims. Further, various different aspects are described, and it is to be appreciated that each described aspect can be implemented independently or in connection with one or more other described aspects.

What is claimed is:

1. A method of managing mobility of a user equipment between a WLAN network and a cellular network, the method comprising:
    sending, by an Access and Mobility Function (AMF) server, a measurement report request to the user equipment, the measurement report request including parameters for measurements to be made by the user equipment of link quality of the cellular network, the WLAN network, or both;
    receiving one or more measurement reports from the user equipment;
    determining to initiate a handoff of the user equipment from a first network slice in the cellular network to a second network slice in the WLAN network; and
    sending a handoff message to the user equipment and a base station in the cellular network, the sending being effective to cause the handoff of the user equipment from the first network slice to the second network slice.

2. The method of claim 1, further comprising:
    receiving handoff status from the user equipment, the base station, or both.

3. The method of claim 2, further comprising:
    receiving additional handoff status from the WLAN network.

4. The method of claim 2, comprising:
    inferring additional handoff status in the second network slice by monitoring user-plane data traffic, control-plane data traffic, or both via the second network slice by the AMF server or by an Access and Mobility Function-Aggregation Proxy (AMF-AP) server.

5. The method of claim 1, wherein the measurement report request includes parameters for measurements to be made by the user equipment of the cellular network, the WLAN network, or both.

6. The method of claim 5, wherein the parameters for the measurements include one or more of: a link quality measurement, an upper-layer metric, a period of time over which to perform the measurements, a time interval between measurements, or a number of measurement reports to provide to the AMF server.

7. The method of claim 1, wherein the first network slice defines a class of service in the cellular network, and wherein the second network slice defines the class of service in the WLAN network.

8. The method of claim 1, the method comprising:
connecting user-plane data to the Internet via a serving gateway of the cellular network for the first network slice and the second network slice.

9. The method of claim 1, the method comprising:
connecting user-plane data to the Internet via an Internet connection of the WLAN network after the handoff.

10. A system comprising:
a WLAN network; and
a cellular network including an Access and Mobility Function (AMF) server, the AMF server configured to:
send a measurement report request to a user equipment, the measurement report request including parameters for measurements to be made by the user equipment of link quality of the cellular network, the WLAN network, or both;
receive one or more measurement reports from the user equipment;
determine to initiate a handoff of the user equipment from a first network slice in the cellular network to a second network slice in the WLAN network; and
send a handoff message to the user equipment and a base station in the cellular network, the sending being effective to cause the handoff of the user equipment from the first network slice to the second network slice.

11. The system of claim 10, wherein the AMF server is configured to:
receive handoff status from the user equipment, the base station, or both.

12. The system of claim 10, wherein the measurement report request includes parameters for measurements to be made by the user equipment of the cellular network, the WLAN network, or both.

13. The system of claim 12, wherein the parameters for the measurements includes one or more of: a link quality measurement, an upper-layer metric, a period of time over which to perform the measurements, a time interval between measurements, or a number of measurement reports to provide.

14. The system of claim 10, wherein the first network slice defines a class of service in the cellular network, and wherein the second network slice defines the class of service in the WLAN network.

15. The system of claim 10, wherein the cellular network includes an Access and Mobility Function-Aggregation Proxy (AMF-AP) server, and wherein user-plane and control plane traffic of the user equipment in the second network slice is relayed by the AMF-AP server to the cellular network.

16. The system of claim 15, wherein a handoff status in the second network slice is inferred by monitoring user-plane data traffic, control-plane data traffic, or both over the second network slice by the AMF server or by the AMF-AP server.

17. The system of claim 10, wherein the AMF server configured to:
send context information to the user equipment via the second network slice using a WLAN Slice UE Context message.

18. An Access and Mobility Function-Aggregation Proxy (AMF-AP) server device comprising:
one or more processors; and
a memory comprising instructions for an Access and Mobility Function-Aggregation Proxy application, the instructions executable by the one or more processors to configure the one or more processors to:
relay control-plane data for a user equipment from a network slice in a WLAN network to an Access and Mobility Function (AMF) in a cellular network; and
relay user-plane data for the user equipment in the network slice to the Internet via a serving gateway of the cellular network.

19. The AMF-AP server device of claim 18, the instructions executable by the one or more processors to configure the one or more processors to:
provide a firewall between the WLAN network and the cellular network.

20. The AMF-AP server device of claim 18, wherein the (AMF-AP) server device is configured to connect multiple network slices of multiple WLAN networks to the cellular network.

* * * * *